(12) United States Patent
Shivnan (10) Patent No.: US 7,079,551 B2
(45) Date of Patent: Jul. 18, 2006

(54) PRIVATE NETWORK LINK VERIFICATION PROCEDURE IN FREE SPACE OPTICAL COMMUNICATION NETWORK

(75) Inventor: Aine Shivnan, Olivenhain, CA (US)

(73) Assignee: Kiribati Wireless Ventures, LLC, Las Vegas, NV (US)

( * ) Notice: Subject to any disclaimer, the term of this patent is extended or adjusted under 35 U.S.C. 154(b) by 579 days.

(21) Appl. No.: 09/949,221

(22) Filed: Sep. 7, 2001

(65) Prior Publication Data

US 2002/0054413 A1 May 9, 2002

Related U.S. Application Data

(60) Provisional application No. 60/238,326, filed on Oct. 5, 2000.

(51) Int. Cl.
G06F 15/173 (2006.01)
G01R 31/08 (2006.01)
H04L 12/28 (2006.01)

(52) U.S. Cl. ............. 370/469; 370/244; 370/254; 370/230; 709/224; 710/17; 710/18

(58) Field of Classification Search .......... 370/216, 370/227, 241, 245, 244, 251, 250, 400, 412, 370/240, 242, 247, 469, 395.5, 395.51, 222; 709/249, 208, 209, 239
See application file for complete search history.

(56) References Cited

U.S. PATENT DOCUMENTS

| | | | |
|---|---|---|---|
| 4,882,774 A | | 11/1989 | Grotzinger |
| 5,546,445 A | | 8/1996 | Dennison et al. |
| 5,675,574 A | * | 10/1997 | Norizuki et al. ............ 370/230 |
| 5,786,923 A | | 7/1998 | Doucet et al. |
| 5,935,215 A | * | 8/1999 | Bell et al. .................... 709/239 |
| 6,016,313 A | | 1/2000 | Foster, Jr. et al. |
| 6,049,593 A | | 4/2000 | Acampora |
| 6,209,039 B1 | * | 3/2001 | Albright et al. ............ 709/249 |
| 6,452,927 B1 | * | 9/2002 | Rich ........................ 370/395.1 |
| 6,594,228 B1 | * | 7/2003 | Naidoo et al. ............. 370/217 |
| 6,795,450 B1 | * | 9/2004 | Mills et al. ................. 370/463 |
| 6,826,146 B1 | * | 11/2004 | Blenis et al. ............... 370/227 |
| 6,850,523 B1 | * | 2/2005 | Karr et al. ............. 370/395.21 |
| 6,868,461 B1 | * | 3/2005 | Mirkhani et al. ............. 710/56 |

FOREIGN PATENT DOCUMENTS

| | | |
|---|---|---|
| WO | WO 97/49204 | 12/1997 |
| WO | WO 98/20631 | 5/1998 |

* cited by examiner

*Primary Examiner*—Hanh Nguyen (57) ABSTRACT

A system and method for verifying the integrity of a communication link in a wireless optical communication network. The system and method include monitoring the communication link on at least two levels and enabling or disabling signaling over the communication link appropriately depending on events reported through the system.

18 Claims, 12 Drawing Sheets

PRIVATE NETWORK LINK VERIFICATION PROCEDURE IN FREE SPACE OPTICAL COMMUNICATION NETWORK

CROSS REFERENCE TO RELATED APPLICATION

This application claims priority to U.S. Provisional patent application 60/238,326 entitled "PNNI LINK VERIFICATION (PLV) PROCEDURE" and filed on Oct. 5, 2000. The disclosure of the above-described filed application is hereby incorporated by reference in its entirety.

BACKGROUND OF THE INVENTION

1. Field of the Invention

The present invention relates generally to communication systems, and to a system and method for verifying a communication link for a communication network.

2. Description of the Related Art

Over the last several years there has been tremendous growth in the deployment of fiber-optic facilities by telecommunications carriers such as Regional Bell Operating Companies (RBOCs), cable carriers, and Competitive Local Exchange Carriers (CLECs). Deployment of these facilities along with the introduction of technologies such as OC-192 and Dense Wave Division Multiplexing (DWDM) has dramatically lowered the marginal cost of bandwidth over fiber optic.

Thus, as a result of this development, there is extensive bandwidth and communications capability in carriers' backbone networks. However, many homes and offices do not have a practical solution to interface to these backbone networks. Consequently, direct attachment of potential customers to these backbone networks remains very expensive.

Currently, there are two practical methods for directly attaching customers to backbone networks such as optical fiber networks. These are buried or aerial fiber interconnections and microwave connections. However, both of these methods incur significant up-front costs before any revenue can be realized. In the case of buried or aerial fiber, these costs are associated with obtaining rights-of-way for the cable runs, and installing the cable by burying or hanging. In the case of a microwave system, these up front costs come not only from the cost associated with the microwave repeater equipment, but also from the costs associated with obtaining rights to the suitable portion of the spectrum. Therefore, system developers and integrators have sought long and hard to find suitable solutions to this "last mile" problem.

There is a need in communication networks to verify the stability of a network. The new types of systems being developed to solve the last mile problem also require stability verification and raise new challenges to such verification through their use of new network elements and new technology.

SUMMARY OF THE INVENTION

A node for use in a freespace optical communication network, wherein the node comprises a plurality of node heads. Each node head comprises an optical receiver and an optical transmitter, and a node base. The node base is coupled with the plurality of node heads, and comprises a control processor and a data transport mechanism switch, wherein the switch is coupled to the control processor and said plurality of node heads. The control processor includes a link verification module for monitoring and verifying the status of a communication link between nodes in the network.

The control processor can further comprise a first state variable configured to indicate the status of a physical layer, a physical layer task configured to monitor the first state variable, and a physical layer interrupt service routine configured to control the physical layer task and report physical layer events to the link verification module. Also included in the control processor are a second state variable configured to indicate the status of a transceiver layer, a transceiver task configured to monitor the second state variable, a link maintenance protocol configured to receive reporting of transceiver events via the transceiver task, and a transceiver manager task module configured to report transceiver layer events to the link verification module.

A method for verifying the status of a communication link in a wireless communication network having a plurality of nodes with optical communication links therebetween, wherein the optical communication link is implemented using an optical receiver/transmitter pair, wherein the receiver/transmitter pair has a physical layer and a receiver/transmitter layer. The method comprises checking the status of the receiver/transmitter layer for changes in the status of the communication link at the receiver/transmitter layer. And if the checking results in a link-up status, then the method further comprises notifying a link verification module of the link up status, checking the status of the physical layer for stability via a physical layer link up procedure, and enabling network signaling over the communication link if the physical layer is stable. If, when checking the status of the receiver/transmitter layer results in a link down status the method further comprises notifying a link verification module of the link down status and disabling network signaling over the communication link.

A method for verifying the status of a communication link in a wireless communication network having a plurality of nodes with optical communication links therebetween, wherein the optical communication link is implemented using an optical receiver/transmitter pair, the receiver/transmitter pair having a physical layer and a receiver/transmitter layer, and wherein the physical layer comprises a plurality of physical layer devices. The method comprises checking the status of the physical layer of the communication link. If the checking results in a changed status, the method further comprises triggering an interrupt service routine, determining which physical layer device triggered the interrupt service routine, calling an appropriate physical layer device interrupt service routine, determining whether a link verification procedure is needed for the physical layer device, and initiating a link verification procedure for the changed status if the link verification procedure is needed. However, if the changed status for the physical layer is from UP to DOWN, the link verification procedure comprises setting a link verification status to down, and checking the status of the receiver/transmitter layer. If the status of the receiver/transmitter layer is UP, then the method further comprises checking the current state of the physical layer, and if the current state of said physical layer is UP, then the method includes checking the number of fluctuations in the state of said physical layer. If the number of fluctuations in the state of the physical layer is less than a specified tolerable amount, the method further comprises enabling network signaling over the communication link. However, if the status of the receiver/transmitter layer is down, the method further comprises disabling network signaling over said communication link.

The link verification procedure also comprises, if the current state of the physical layer is DOWN, checking the number of times the link verification task has been performed. If the number of times is less than a specified number allowed, then the method includes returning to setting a link verification status to down. Otherwise, if the number of times is more than a specified number allowed, then the task is stopped.

However, if the current state of the physical layer is UP, the link verification procedure further comprises checking the number of fluctuations in the state of the physical layer, and if the number of fluctuations in the state of the physical layer is more than a specified tolerable amount the link verification task is rescheduled.

BRIEF DESCRIPTION OF THE DRAWINGS

The present invention is described with reference to the accompanying drawings. In the drawings, like reference numbers indicate like elements.

DETAILED DESCRIPTION OF THE PREFERRED EMBODIMENT

Figure 1:
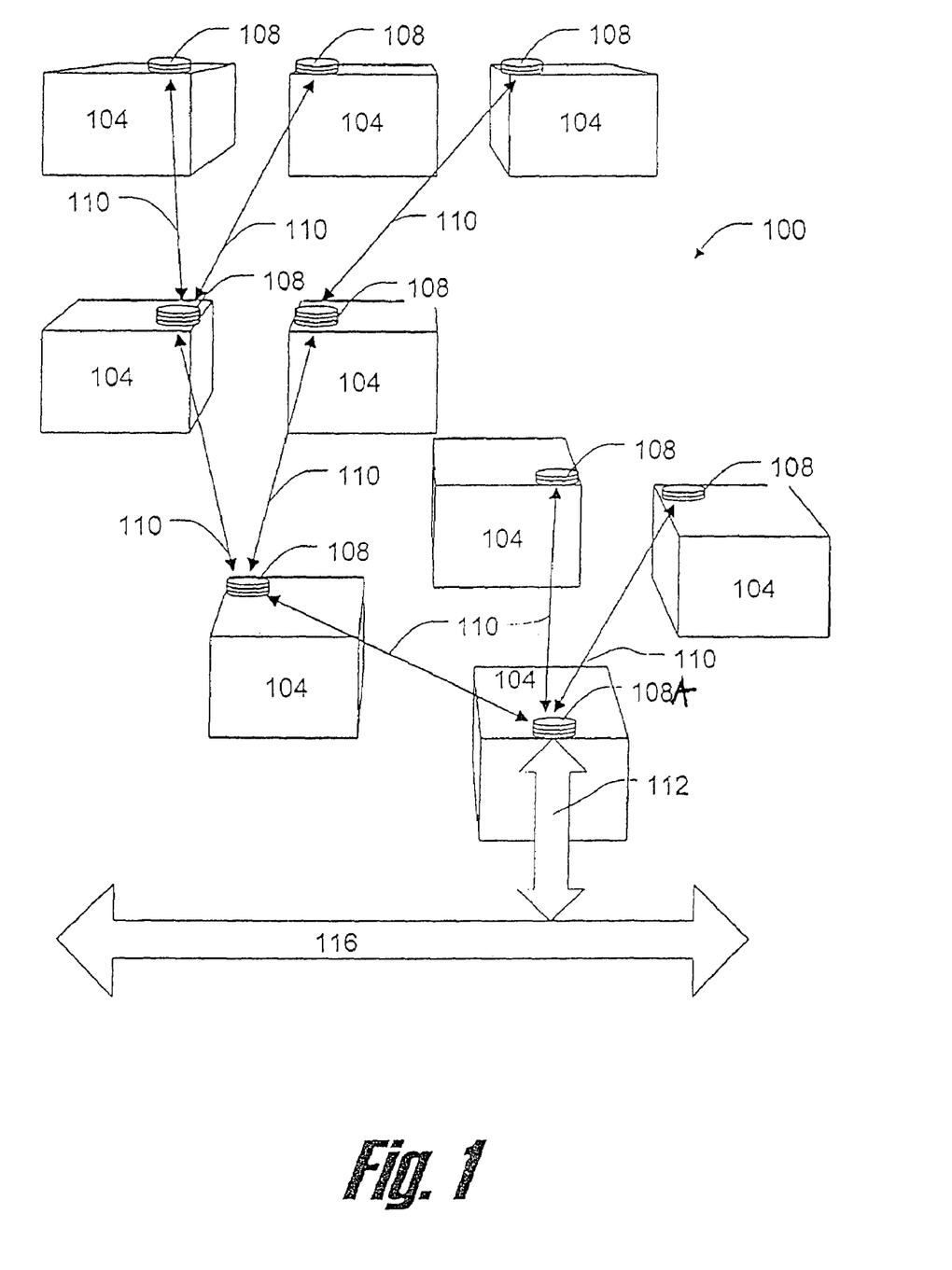
FIG. 1 is a diagram of an example communication network.

FIG. 1 is a diagram illustrating an example communication network 100. The communication network 100 illustrated in FIG. 1 can include a plurality of nodes 108, interconnected by communication links 110. The network nodes 108 are disposed on facilities 104. Although only one node 108 is provided per facility in the example illustrated in FIG. 1, more than one node 108 can be provided at one or more of facilities 104 depending on the communication requirements of the particular facility.

In exemplary embodiments of the network system, the facilities 104 can be buildings, towers, or other structures, premises, or locations. The facilities 104 can, for example, be homes or offices to which it is desirable to interface one or more backbone networks of one or more common carriers or service providers. In these embodiments, the network 100 can provide the interface between the facilities 104 and the backbone network.

The nodes 108 can be interconnected with one another by optical communication links 110. In this optical embodiment, the nodes 108 can include one or more optical transmitters and receivers to provide communication links 110 among the plurality of nodes 108. The nodes 108 can also be implemented such that the communication links 110 are radio frequency (RF) communication links. Additionally, the communication links 110 can be a combination of optical links and RF links. For example, each optical link can have a backup RF link for use in cases of failure of the optical link. Although the nodes 108 can be hardwired together, it is preferable that the communication links 1 10 be wireless communication links to better facilitate interconnection of a variety of facilities 104.

The number of transmitters and receivers provided at a given node 108 can be varied depending on the fan-out capabilities desired at that node 108. However, in one embodiment, each node 108 has up to four transceivers, allowing each node 108 to connect its associated facility 104 with up to four additional nodes 108 at four additional facilities 104. The provision of both a receiver and transmitter (i.e., transceiver) for each fan out of the node 108 allows bi-directional communication among nodes 108.

In optical embodiments, transceivers at the nodes 108 can be implemented using, for example, lasers or light emitting diodes (LEDs) as the optical transmitters and charge-coupled devices (CCDs), photomultiplier tubes (PMTs), photodiode detectors (PDDs) or other photodetectors as the receivers. Transmitter and receiver technologies for one or more preferred optical embodiments are discussed further hereafter.

Although the network 100 illustrated in FIG. 1 is illustrated as a branching tree network structure, other network structures or geometry's, such as a point-to-point configuration, can be implemented. For example, a mesh network structure such as described in U.S. Pat. No. 6,049,593 to Acampora, hereby incorporated by reference, can be used.

The network 100 can be implemented and utilized to directly connect a plurality of customers in one or more facilities 104 to a high-capacity communication network 116. For example, the network 100 can be used to connect the plurality of customers to a communication network 116 such as a high bandwidth copper or fiber service provider or common-carrier network. Advantageously, network 100 can therefore allow customers to access a high data rate, high-bandwidth communication network 116 from their home, office or other facility 104, regardless of the existing connection capabilities within that facility. Thus, the network 100 can be implemented to avoid the need to cable the backbone network 116 over the "last mile" to each facility 104.

To accomplish this objective, at least one of the nodes 108 is designated as a root node 108A. The root node 108A includes additional functionality to interface the communication network 100 to the provider network 116 via another communication link 112.

A service provider can provide service to users in a plurality of facilities 104 by providing a signal to the root node 108A of the system through the communication link 112. In one embodiment, nodes 108 use the Asynchronous Transfer Mode (ATM) as the data transport mechanism. Although nodes 108 can use other transport mechanisms, in this embodiment the service provider provides data to the root node 108A as ATM cells. In this manner, node 108A does not have to perform a format translation. In alternative embodiments, format translation can be provided to allow flexibility. To provide ATM cells, the service provider can provide a pre-atomized concatenated signal, such as a Synchronous Optical Network (SONET) signal to the root node 108A via the provider network 116 and communication link 112.

Figure 2:
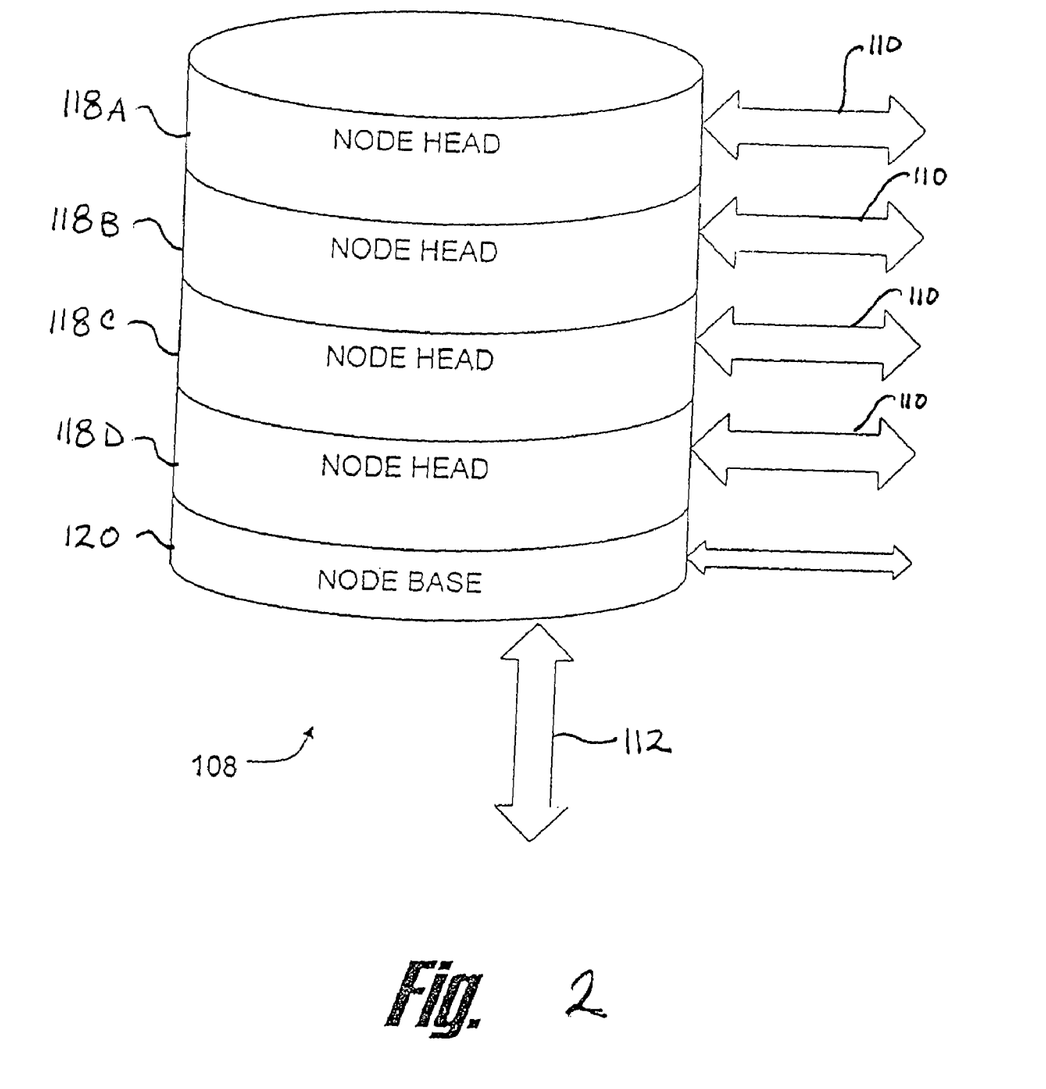
FIG. 2 is an illustration of a node.

FIG. 2 shows an exemplary embodiment of the node 108 comprising a node base 120 and up to four node heads 118A–D, which are also referred to as wireless transceivers, or turrets. The node base 120 communicates with all four node heads 118A–118D along with the facility 104, and node heads 118A–118D communicate with other node heads 118 of additional nodes 108 via the communication links 110. As previously discussed, the communication links 110 can be any type of communication links, such as microwave or RF. Additionally, the node does not need to have a plurality of node heads or a node base separate from the node heads. The node may be comprised of a single component for receiving and transmitting a communication signal, and processing information.

Figure 3:
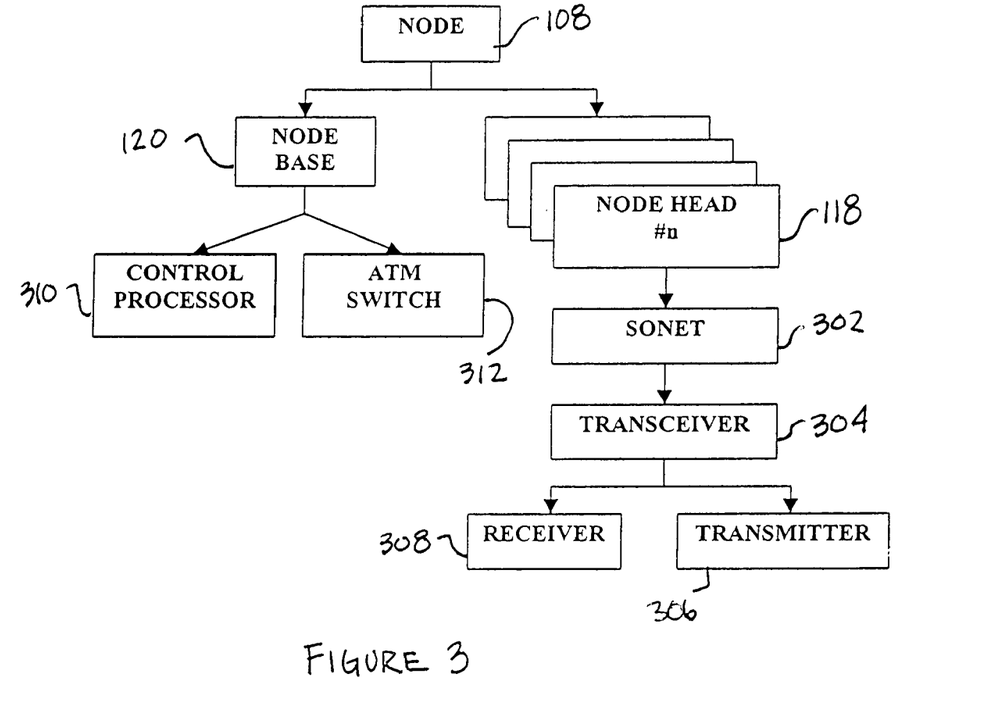
FIG. 3 is a block diagram of the hardware of the node of FIG. 2.

An exemplary block diagram of the node 108 is shown in FIG. 3. In the node base 120 there is a control processor 310 where the processing of data within the node 108 can be executed, and an ATM switch 312. The ATM switch 312 is an example of a data transport mechanism switch and it will be appreciated that other types of data switches or transport mechanisms such as TCP/IP can be used. Each node head 118 is comprised of a SONET component 302 with a transceiver 304. Each transceiver 304 comprises an optical transmitter 306 and receiver 308. The transceivers 304 can be transceivers for any type of communication link 110, or combination thereof in each node, such as microwave or RF, and are not limited to SONET components.

There are two levels in which the communication links 110 can be monitored within each node 108. The first is a physical level (PHY level) which, in this example consists of synchronous optical network (SONET) layers for each transceiver, and a switch, or ATM layer. In additional embodiments the SONET can be replaced with an ethernet, and/or the ATM switch replaced with an IP (Internet Protocol) stack. More generally, the first level is related to data transport. The second level that can be monitored is a turret level, including for example, a peer communication link communicating high level information concerning node operation from one node to another. More generally, the second level is related to the content of transported data. For example, it is at the second level that the node could detect that it is receiving a signal from the wrong source. The second level, comprising peer communication, is considered a higher priority level in the event of failure than the PHY level. It will be appreciated that the communication link 110 may only need monitoring at a single level, such as the PHY level, such that the single monitoring level can provide enough information about the integrity of the communication link to effectively monitor it.

Modules in the node 108, for example software running on control processor 310, maintain link state variables to track the state of the communication link 110 between adjacent nodes 108 at each level. The terms "module" or "task," as used herein, mean, but are not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 4A:
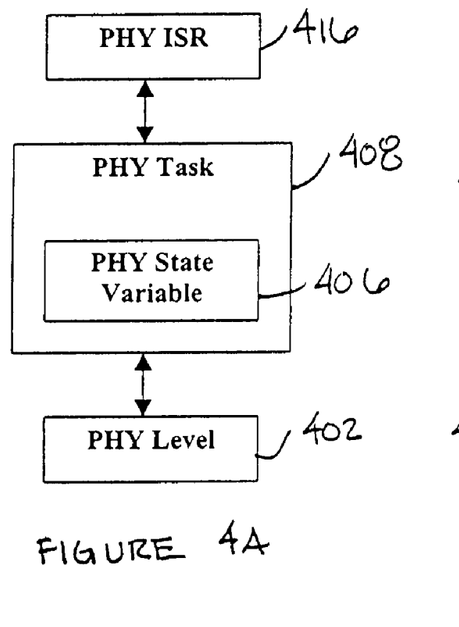
FIG. 4A is a block diagram illustrating the notification link to monitor the PHY level in a node.
Figure 4B:
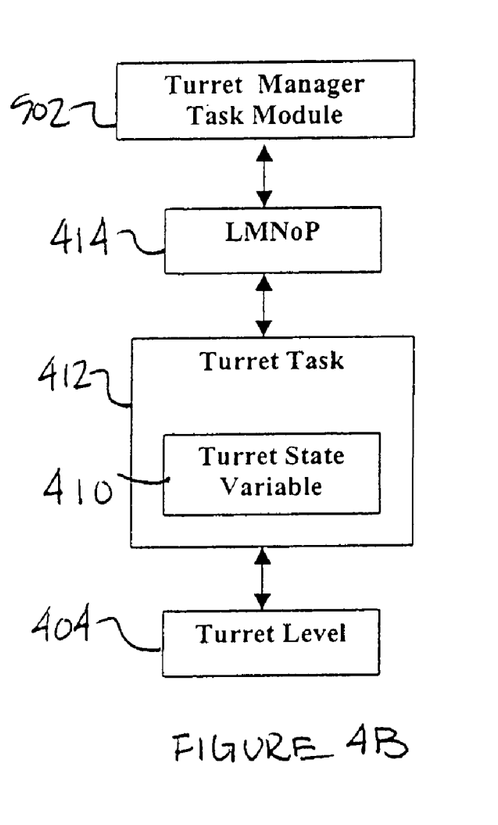
FIG. 4B is a block diagram illustrating the notification link to monitor the turret level in a node.

Referring now to FIGS. 4A and 4B, the link state variables consist of the PHY link state variable 406, which indicates the state of the PHY level 402. The PHY link state variable is monitored by a PHY task 408. The PHY task 408 maintains the PHY link state variable 406 via event and trap notification controlled by a PHY Interrupt Service Routine (ISR) 416. A turret link state variable 410 is monitored by a turret task 412, wherein the turret link state variable 410 indicates the state of the turret level 404. The turret task 412 maintains the turret link state variable 410 for each turret or node head 118 using information exchanged with the turret manager task module 502 via a Link Maintenance Node Protocol (LMNoP) 414.

Figure 5:
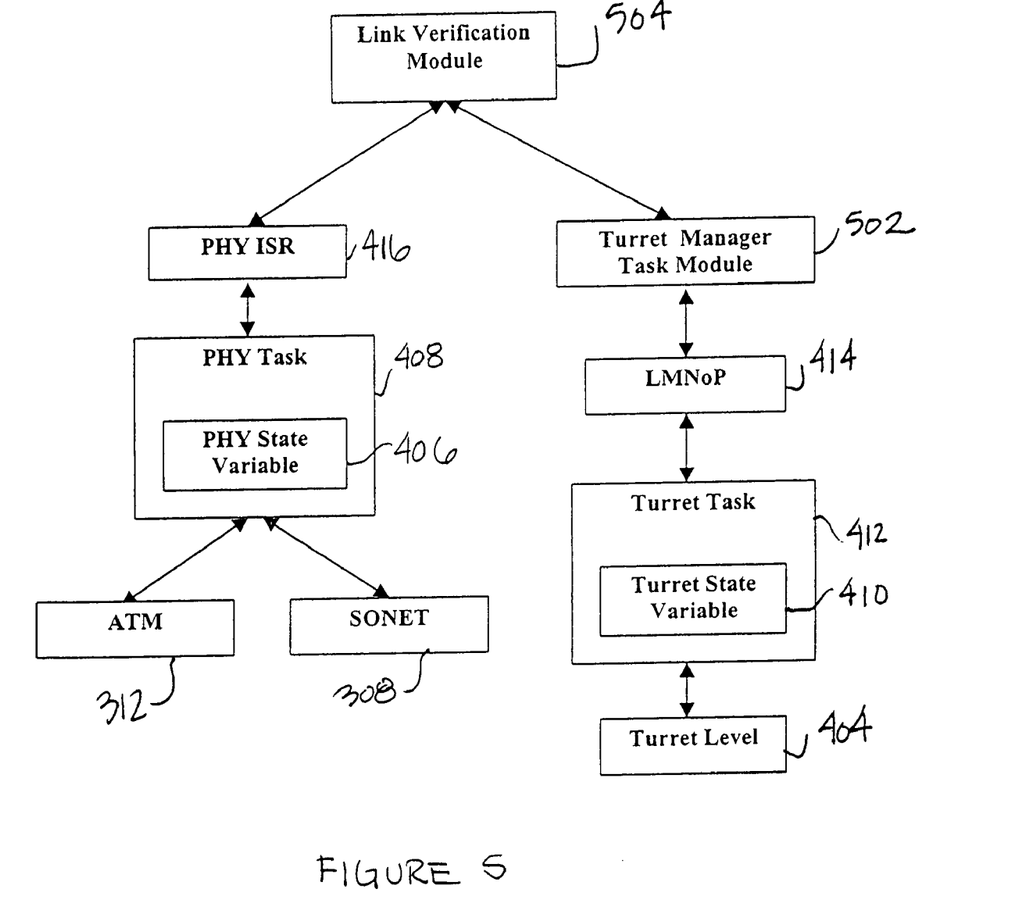
FIG. 5 is a block diagram illustrating the link verification mechanism.

The PHY level 402 and the turret level 404 differ in terms of verification time to determine the status of a communication link 110. In one embodiment, the PHY ISR mechanism immediately reports when there is any PHY level transition. The private network link verification (PLV) module fills the gap between the information managed by the turret task 412 and by the PHY task 408. As illustrated in FIG. 5, a PLV module 504 exchanges information with the PHY ISR 416 and the Turret Manager Task Module 502. The PLV module 504 can track reporting of PHY events via the PHY ISR 416 in areas of the node such as the SONET component 302 and the ATM switch 312. The PLV module 504 can track reporting of turret events via the Turret Manager task module 502 from the LMNoP 414, which exchanges information with the Turret layer 404. The PLV module 504 monitors PHY events and Turret events such that when either link state variable 406, 410, for each level 402, 404, is DOWN, signaling and user data traffic over the communication link 110 corresponding to the correct node head 118 is brought down. When both link state variables 406, 410 are UP, and the viability of the link has been established by the PLV task, the transfer of signaling and user data over the communication link 110 corresponding to the correct node head 118 is enabled. The process of network link verification for the PHY level 402 and the turret level 404 will be discussed in more detail further hereafter with reference to additional figures.

Figure 6:
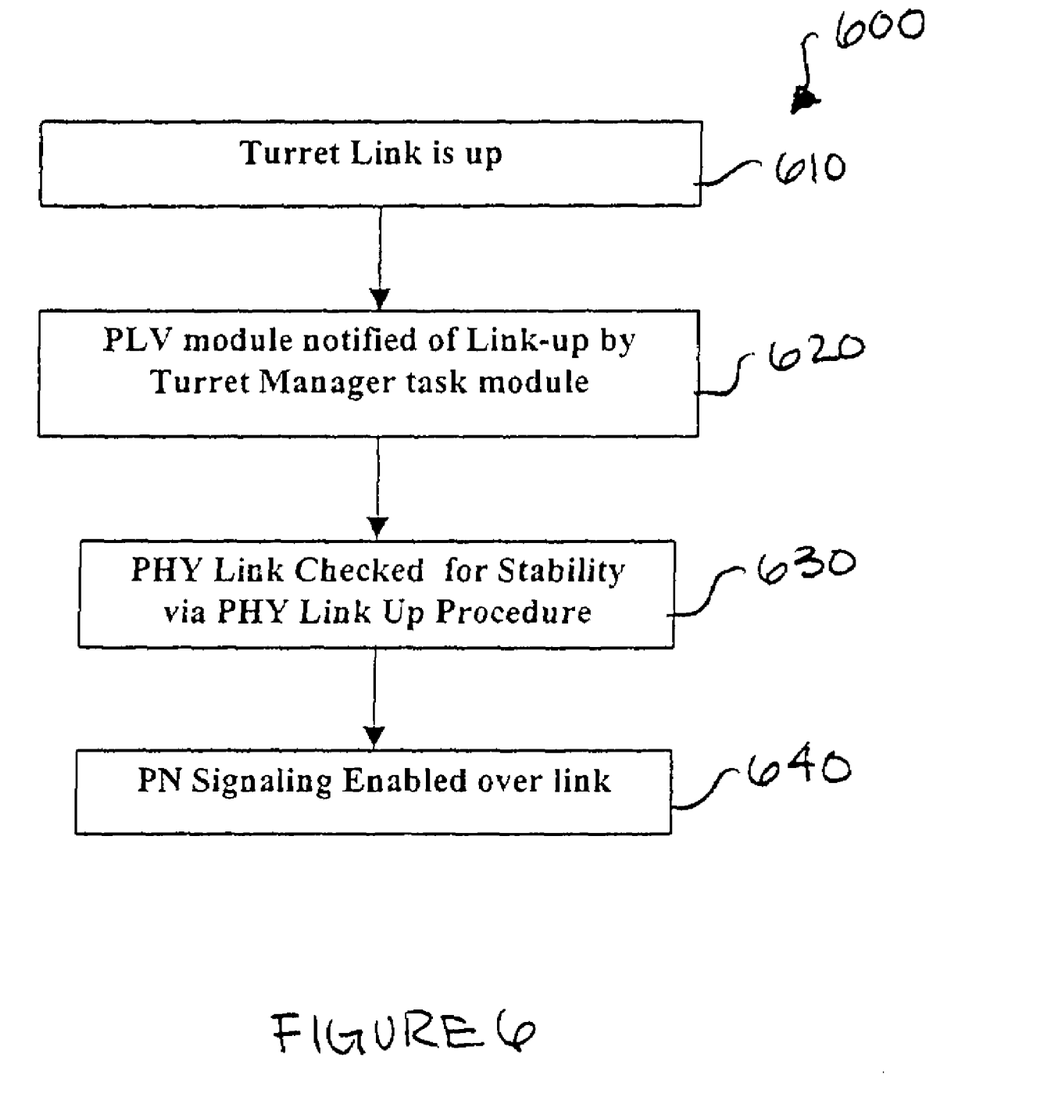
FIG. 6 is a flow diagram illustrating link activation via a turret link up event.

The flow diagram of FIG. 6 illustrates a turret link activation procedure 600 triggered by a turret link up event. When a link comes up over the turret, activated by a link up event 610 such as powering up the turret, in a step 620 the establishment of the link is communicated by the Turret Manager task module 502 to the PLV module 504. In a step 630 the PHY link is then checked for stability by the PLV PHY link up procedure discussed further hereafter. If the PHY link is verified as being stable, then in a step 640 network and ATM signaling is enabled over the link 110 that was initiated by the link up event.

Figure 7:
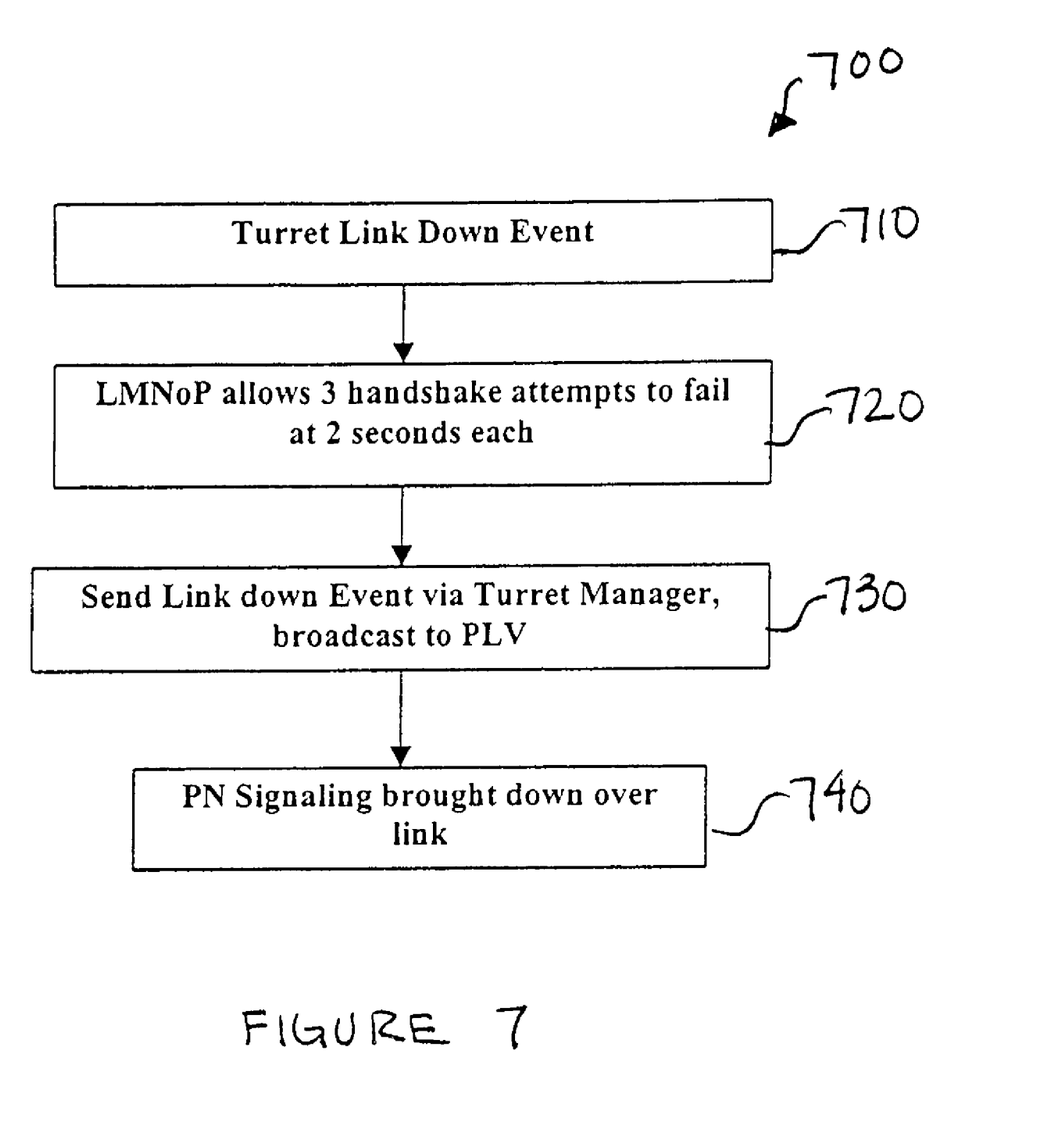
FIG. 7 is a flow diagram illustrating a turret link down procedure via a turret link down event.

The flow diagram of FIG. 7 illustrates a turret link down procedure 700 due to a turret link down event 710 such as loss in power or physical connection to the network 100. In a step 720, the LMNoP 414 allows for three hand shake attempts with the peer node with which the present node 108 desires a communication link 110. The three handshake attempts are allowed to fail before determining that the turret link has failed. Alternately, more or fewer attempts can be allowed. In one embodiment, the period of this handshake is every 2 seconds which allows a link to have failed for up to 6 seconds before a turret link state of DOWN is broadcast in a step 720 via the Turret Manager to the PLV mechanism as a Turret down event. In some cases, such as the detection of a reflected signal which will be discussed further hereafter, the handshake attempts of step 720 can be bypassed. In a step 740 the PLV mechanism receives the turret link down event from the turret task 412 and brings down signaling over the communication link 110.

An additional example of a turret failure is an event when the signal received at the PHY level 402 is actually the transmitted signal from the same transceiver 304 or from a transceiver other than the intended target. In one embodiment, the PHY level 402 does not have the capability to recognize this type of failure, therefore it is monitored at the turret level. An embodiment of this detection done at the turret level 404 is via identifiers that are embedded within messages of the LMNoP 414 to indicate which transmitter 306 has sent the message. If the turret task 412 determines that this message is not from the intended target, the link 110 is deemed as having failed. Another example turret failure is the reception of data from a third, unexpected transmitter. This traffic again can be distinguished by the turret task 412 via identifiers, implemented in the LMNoP 414, specifying the node 108 or link 110 to which it is associated.

Figure 8:
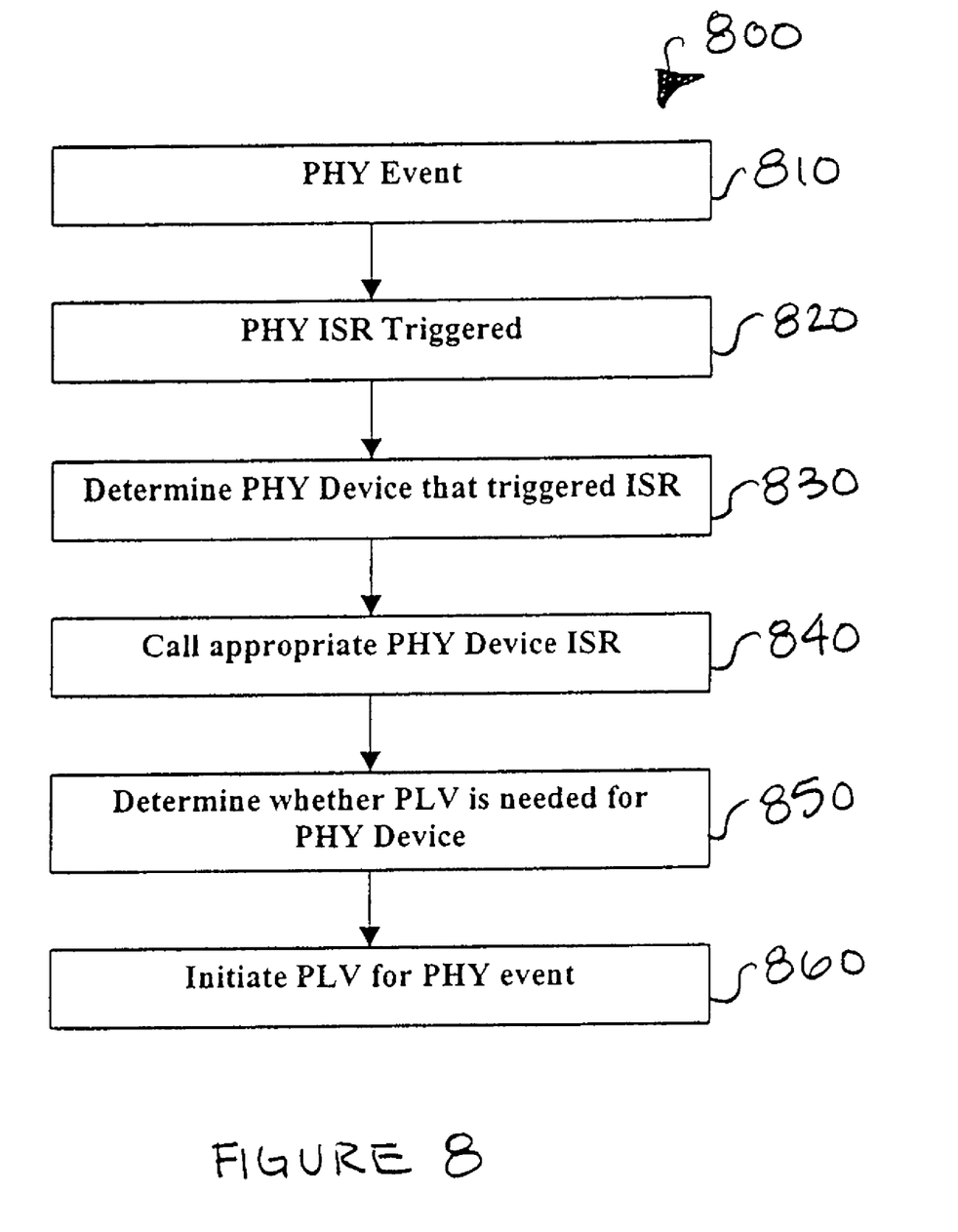
FIG. 8 is a flow diagram illustrating the execution of the PHY Interrupt Service Routine (ISR).

To monitor the PHY level 402 of the node 108 the PHY ISR 416 is used directly by the PLV module 504 in a PLV task as illustrated in FIG. 8. All the PHY levels (ATM and SONET) in a single node 108 trigger a single interrupt and interrupt routine 416. Alternatively, the ATM layer can trigger the ISR 416 through the SONET layer. In a step 810 a PHY event occurs followed by a step 820 in which the PHY ISR 416 is triggered. The PLV task is scheduled directly from this ISR. Events at the SONET level that can trigger the PHY ISR 416 include, but are not limited to, changes in the state of the SONET section, line, and path layer, along with various ATM conditions such as loss-of-cell delineation. When the PHY ISR 416 executes, in a step 830 it determines which device(s) triggered the interrupt followed by a step 840, which calls the appropriate device ISR. In a step 850 the device ISR will verify whether PN link verification is required for the particular link that triggered the ISR. If PN link verification is required, in a step 860 link verification is scheduled for the original PHY event 810.

PN link verification, performed by the PLV task, is scheduled either by the PHY ISR 416 or by a link up request for the purpose of PN communication. The PLV module 504 first checks the state of the PHY task 408 that initiated the PLV task. From the time the PLV task was originally scheduled it is possible the link 110 has been fluctuating, and thereby causing a number of interrupts to have occurred. The current state information of the PHY and Turret tasks 408, 412, and the interrupts caused by fluctuations in link 110 are used to determine the stability of link 110 and whether or not to bring PN signaling down or up over the link 110.

Figure 9:
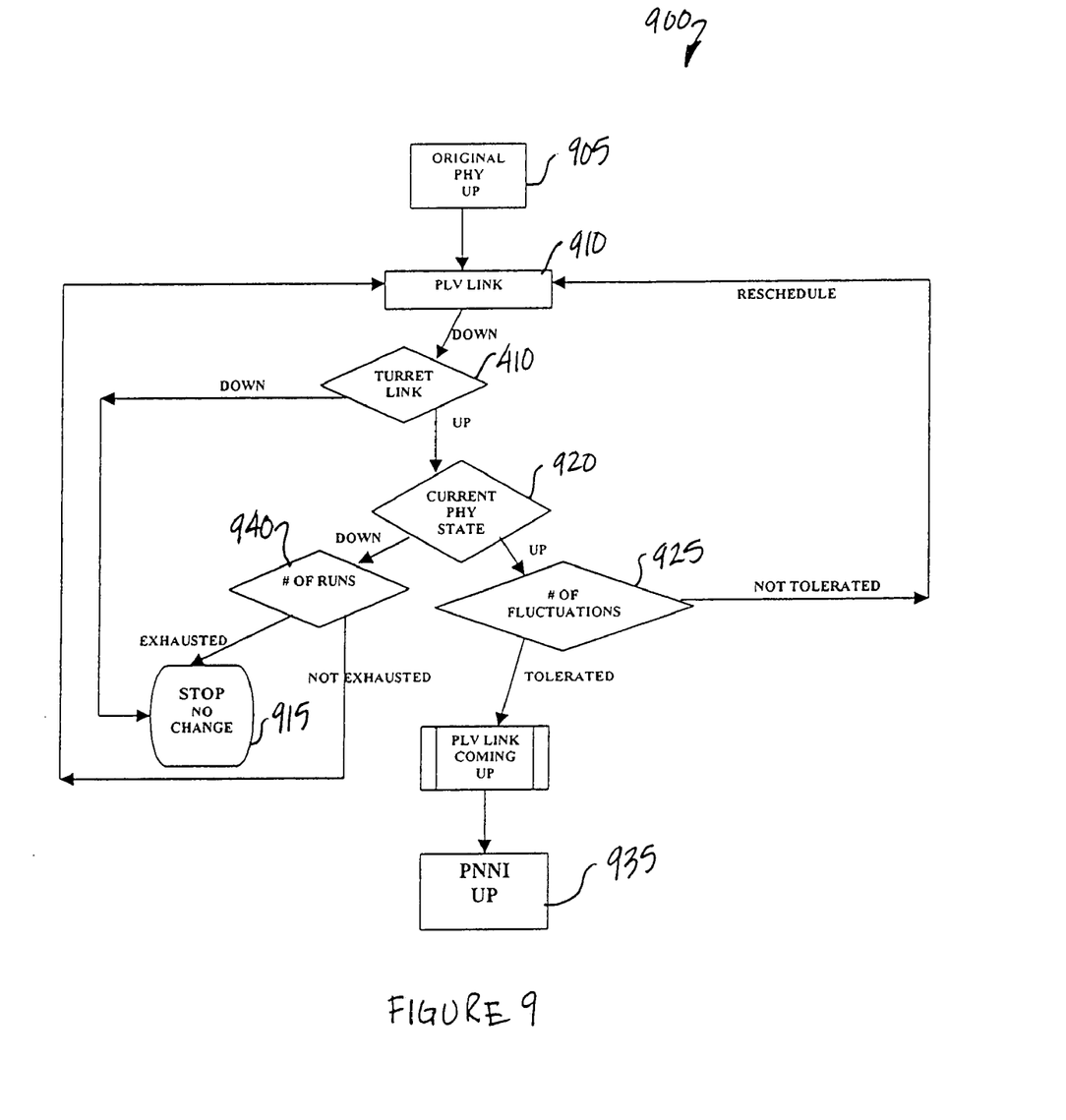
FIG. 9 is a state diagram illustrating PN link up verification for a PHY link up event.

A state diagram of a PN Link Up Verification task 900 is shown in FIG. 9. PN Link Up Verification 900 is typically scheduled when the original PHY state is changed to UP 905, changing the PLV link state 910 from IDLE to DOWN. If the Turret link state 410 is DOWN then the PLV link state is left DOWN and the PLV task stops 915. If the Turret link state is UP then the current PHY state 920 is polled.

If the current PHY state is UP then the number of fluctuations 925 (number of state transitions of the PHY link from the original link state which caused PLV to be scheduled) in the link is polled and compared with the number tolerable. The number of tolerable fluctuations is configurable and for this embodiment five fluctuations are allowed. If the number of fluctuations is below the acceptable amount tolerable the PLV link state 910 is COMING_UP and PN signaling is enabled 935 over the link. However, if the number of fluctuations in the link 925 exceeds the tolerable amount the PN Link Up Verification 900 task is rescheduled.

If the current PHY state 920 is DOWN for a Link Up Verification 900 then the number of runs 940 of the task for this link is examined and if the number of retries is exhausted then the PLV state 910 is left DOWN and the PLV task stops 915. If the number of runs 940 is not exhausted then the PN Link Up Verification task 900 is rescheduled.

Figure 10:
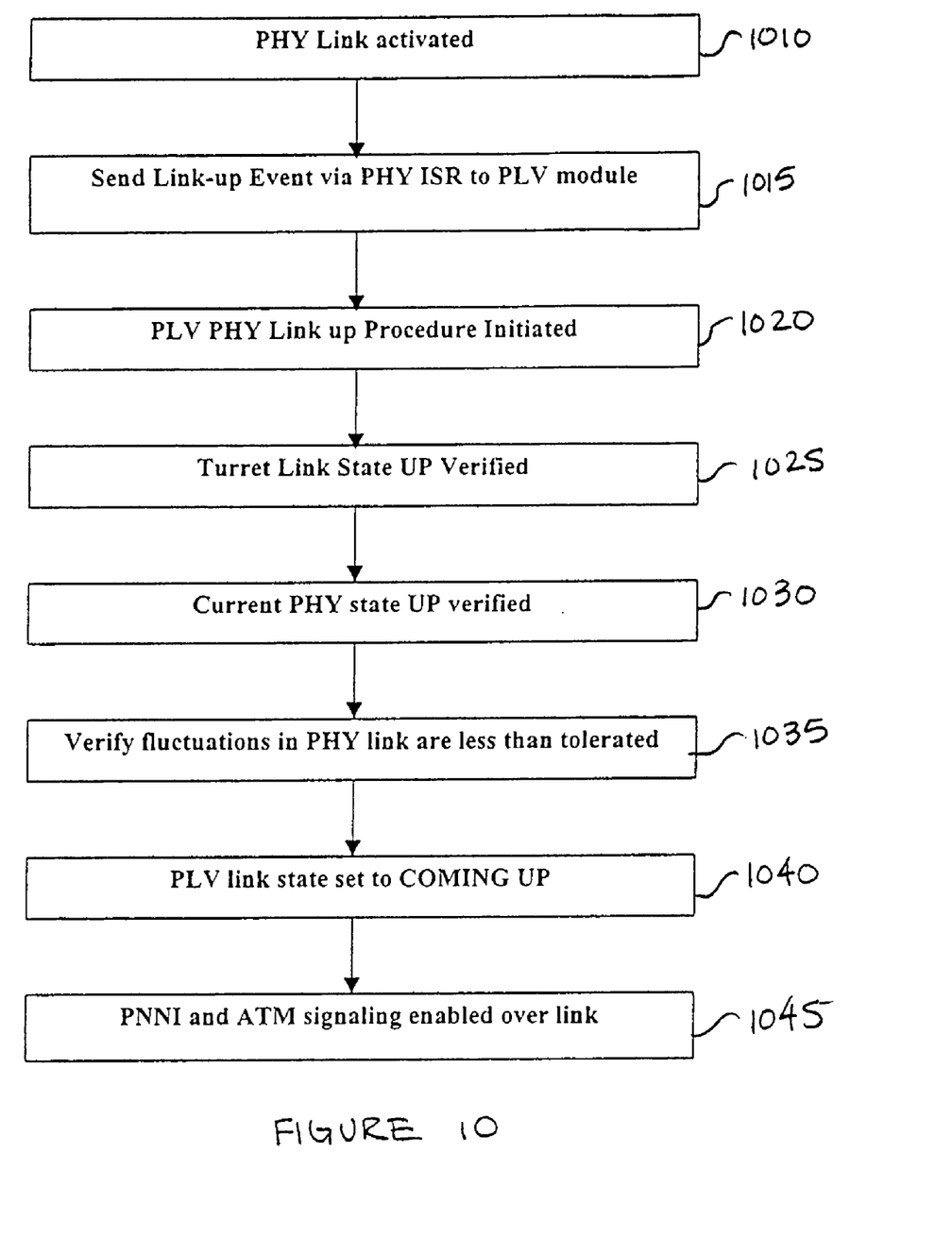
FIG. 10 is a flow diagram illustrating the process to enable network communication from a PHY link up event.

The flow diagram of FIG. 10 illustrates the steps used to enable PN link 110 communication from a PHY link up event. In a step 1010 a PHY link is activated, for example, following a link down event, followed by a step 1015 in which the Link up event is sent by the PHY ISR 416 via the PHY device driver to the PLV module. In a step 1020 the PN Link Up Verification 900 is initiated by the PHY ISR 416. In a step 1025 the turret link state 410 UP is verified either by the turret task 412 or directly by the PLV task 900, followed by a step 1030 in which the current PHY state 920 UP is verified by the PLV task 900. In a step 1035 the number of fluctuations 925 in the PHY link are verified by the PLV task 900 as being less than tolerable, followed by a step 1040 wherein the PLV task sets the PLV link state as COMING UP, and in a step 1045 PN and ATM signaling is enabled 935 over the link 110.

Figure 11:
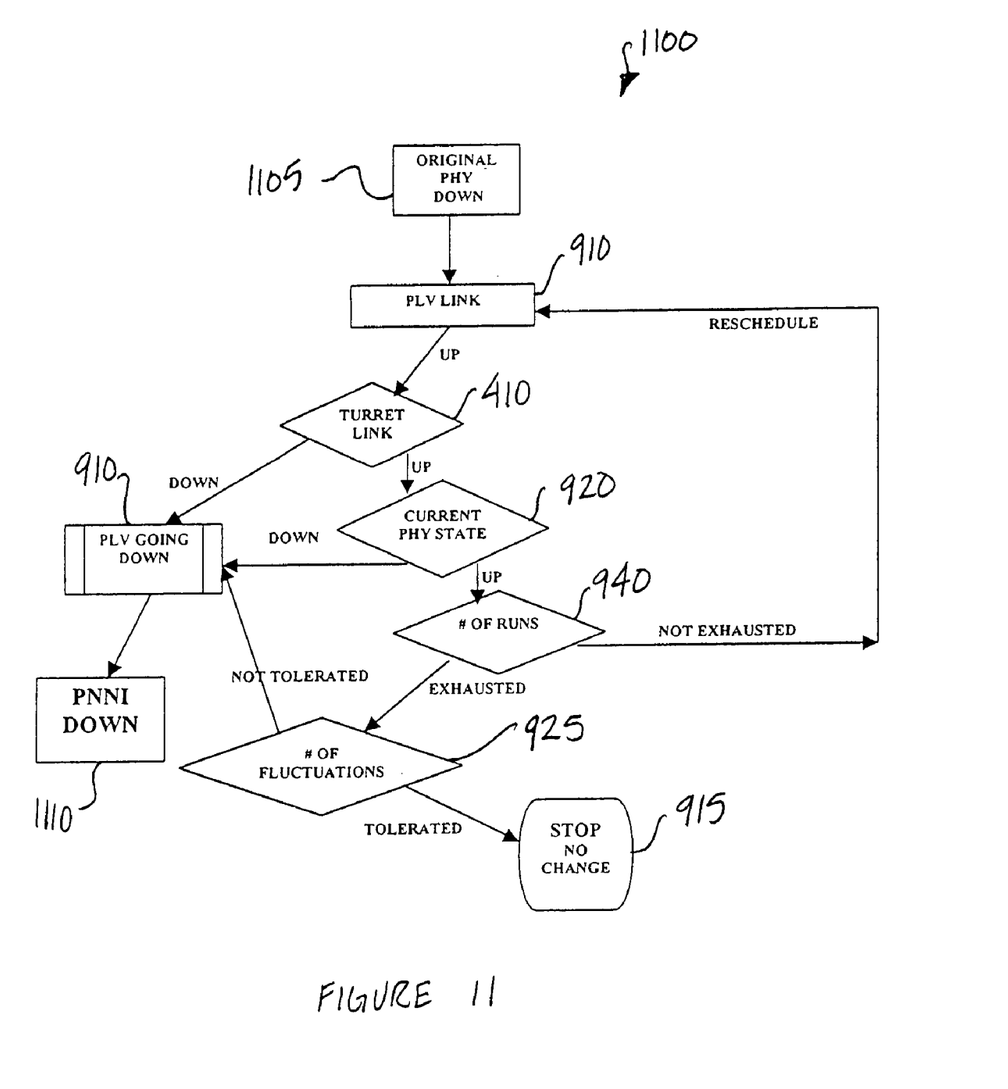
FIG. 11 is a state diagram illustrating network link down verification for a PHY link down event.

A state diagram of a PN Link Down Verification task 1100 is shown in FIG. 11. PN Link Down Verification 1100 is scheduled by the original PHY state DOWN 1105, changing the PLV link state 910 from IDLE to UP. If the Turret link state 410 is DOWN then the PLV link state 910 is GOING DOWN and the PN link 110 is brought down 1110. If the Turret link state 410 is UP then the current PHY state 920 is polled.

If the current PHY state 920 is UP then the number of runs 940 is polled by the PLV task 900, and if not exhausted, then the PN Link Down verification 950 is rescheduled. If the number of runs 940 is not exhausted then the number of fluctuations in the link 925 is polled by the PLV task 900 and compared with the number tolerable. If the number of fluctuations 925 is below the acceptable amount tolerable the PLV link state 910 is left UP and the PLV task stops 915. However, if the number of fluctuations in the link 925 exceeds the tolerable amount the PLV link state 910 is GOING_DOWN and the PN link 110 is brought down 1110.

If the current PHY state 920 is DOWN then the PLV link state 910 is GOING_DOWN and the PN link 110 is brought down 1110.

Figure 12:
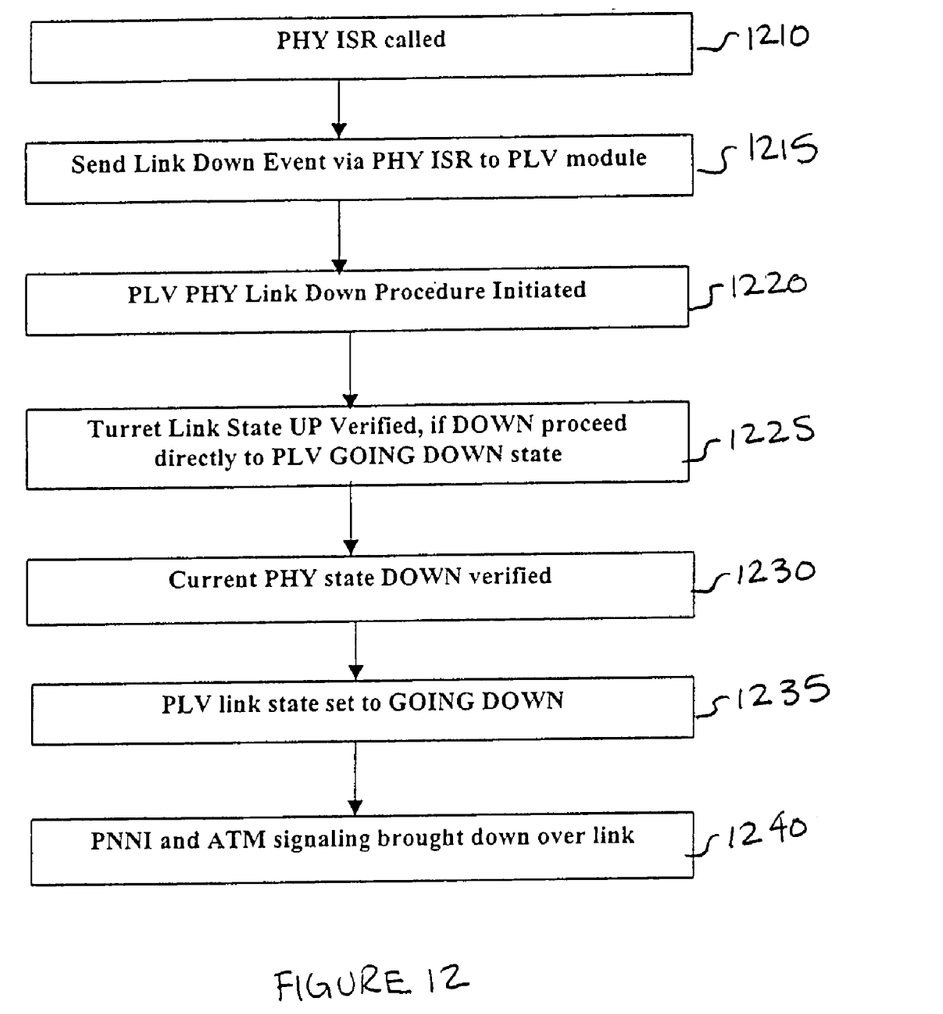
FIG. 12 is a flow diagram illustrating the process to disable network communication from a PHY link down event.

The flow diagram of FIG. 12 illustrates the steps used to bring down communication over the network link 110 from a PHY link down event. In a first step 1210 the PHY ISR 416 is called by an individual PHY component, followed by a step 1215 where a link down event is sent from the PHY ISR 416 to the PLV module 504. In a step 1220 the PLV link down procedure 950 is initiated by the PHY ISR 416. In a step 1225 the turret state 410 is verified UP from the turret task, however, if the turret state is DOWN, then the process proceeds directly to the PLV link state 910 GOING_DOWN. In a step 1230 the current PHY state 920 is verified DOWN by the PLV task, followed by a step 1235 where the PLV link state 910 is set to GOING_DOWN. The final step 1240 in the link down verification brings down PN and ATM signaling over link 110.

As previously discussed, in one embodiment, the PHY ISR mechanism immediately reports when there is any PHY level transition, allowing an embodiment where the PLV module could immediately determine that the link has failed and execute the appropriate steps. This embodiment, however, provides for a configurable time period to expire after a transition has been reported, after which the link status is verified, thus handling the case where minor signal fluctuations in the link would not constitute a permanent failure. At the turret level 404 after the turret state variable 410 has been initialized the turret task polls every two seconds to determine if its state has changed. This state is maintained by the periodic exchange of handshake information via LMNoP 414 over the turret link. In the case of a link failure of the turret communication link 404, the turret task allows for 3 LMNoP handshake attempts to fail before verifying that the link has failed. An example of a link failure that can only be verified by the turret task is one in which the turret communication link is "reflected" back on itself. At the PHY signal level the link will appear viable and PLV would not be engaged. LMNoP will examine identifiers within the protocol and determine that the link is being reflected and will change the state of the turret link variable accordingly. As previously discussed the turret level 404 is a higher priority to the node 108 than the PHY level 402 and therefore requires fewer handshake attempts to verify the status of the communication link at its particular level 404.

The handshake attempts and almost immediate indication of changes in the link states 406, 410 allow PLV to effect rapid detection of link interruptions and qualification of the interruptions as a failure in the link 110. Prior art methods of link failure detection and, more importantly, verification required 10–15 seconds to pass before a link failure was verified. The method disclosed herein greatly improves upon this failure time by reducing it to a configurable maximum for a link failure verification. Improvements in the link verification procedure may also be made by implementing the procedure using strictly hardware, or a combination of hardware and software, rather than using a method strictly employing the control processor as is described above.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of verifying a communication link in a wireless communication network, wherein the network has a plurality of nodes with transceivers, said method comprising:
    monitoring said communication link at a first level, said first level comprising a physical layer of components;
    monitoring said communication link at a second level, said second level comprising a transceiver layer;
    when said first level reports a change in status:
    performing a link verification task;
    when said second level reports a failure:
    disabling signaling over said communication link; and
    when said second level reports a link up request:
    verifying a positive status of said physical layer; and
    enabling signaling over said communication link.

2. The method of claim 1, wherein when said second level reports a failure, said method further comprises allowing at least one handshake attempt for said transceiver layer before disabling signaling over said communication link.

3. A system for verifying a communication link in a wireless optical communication network, wherein the network has a plurality of nodes with optical transceivers, comprising:
    means for monitoring said communication link at a first level, said first level comprising a physical layer of components;
    means for monitoring said communication link at a second level, said second level comprising a transceiver layer;
    when said first level reports a change in status:
    means for performing a link verification task;
    when said second level reports a failure:
    means for disabling signaling over said communication link; and
    when said second level reports a link up request:
    means for verifying a positive status of said physical layer; and
    means for enabling signaling over said communication link.

4. The system of claim 3, wherein said means for monitoring said communication link at said first level comprises an interrupt service routine.

5. The system of claim 3, wherein said means for monitoring said communication link at said second level comprises a communication link maintenance protocol.

6. The system of claim 3, wherein said link verification task comprises a plurality of steps including verifying the status of said transceiver layer, and verifying the stability of said physical layer.

7. A method for monitoring the status of a communication link comprising a first layer and a second layer, said method comprising:
    monitoring said first layer of said communication link, wherein said layer is a physical layer, wherein said monitoring said first layer includes detecting a change in status of said first layer;
    monitoring said second layer of said communication link, wherein said second layer is a higher-level layer than said first layer;
    checking the status of said second layer if said change in status of said first layer is from down to up;
    checking the current statue of said first layer if said checked status of said second layer is up; and
    enabling transmission of data over said communication link based at least in part on results of said monitoring of said first layer and said monitoring of said second layer.

8. The method of claim 7, wherein if said current status of said first layer is up, said method further comprising:
    determining a number of changes in the status of said first layer; and
    enabling transmission of data over said communication link based upon said number of changes in the status of said first layer.

9. The method of claim 7, wherein if said current status of said first layer is down, said method further comprising:
    repeating said checking the status of said second layer and said checking the current status of said first layer.

10. A method for monitoring the status of a communication link comprising a first layer and a second layer, said method comprising:

monitoring said first layer of said communication link, wherein said first layer is a physical layer, and wherein said monitoring said first layer includes detecting a change in status of said first layer;

monitoring said second layer of said communication link, wherein said second layer is a higher-level layer than, said first layer;

checking the status of said second layer if said change in status of said first layer is from up to down;

checking the current status of said first layer if said checked status of said second layer is up; and enabling transmission of data over said communication link based at least in part on results of said monitoring of said first layer and said monitoring of said second layer.

11. The method of claim 10, further comprising repeating said checking the status of said second layer and said checking the current status of said first layer in order to determine a number of changes in the status of said first layer, and further comprising enabling transmission of data over said communication link based upon said number of changes in the status of said first layer.

12. An apparatus, comprising
an interface to a communication link, wherein said communication link comprises a first layer and a second layer, wherein said first layer is a physical layer, and wherein said second layer of said communication link is a higher-level layer than said first layer; and a processor configured to monitor the status of said first layer and said second layer of said communication link, and wherein said processor is configured to enable transmission of data over said communication link based at least in part on results of monitoring said first layer and said second layer;

wherein said processor is configured to detect a change in status of said first layer, wherein if said change in status of said first layer is from down to up, said processor is further configured to check the status of said second layer; and wherein if said checked status of said second layer is up, said processor is further configured to check the current status of said first layer.

13. The apparatus of claim 12, wherein if said current status of said first layer is up, said processor is further configured to determine a number of changes in the status of said first layer and enable transmission of data over said communication link based upon said number of changes in the status of said first layer.

14. The apparatus of claim 12, wherein if said current status of said first layer is down, said processor is further configured to repeat checking the status of said second layer and checking the current status of said first layer.

15. An apparatus, comprising:
an interface to a communication link, wherein said communication link comprises a first layer and a second layer, wherein said first layer is a physical layer and wherein said second layer of said communication link is a higher level layer than said first layer; and a processor configured to monitor the status of said first layer and said second layer of said communication link and wherein said processor is configured to enable transmission of data over said communication link based at least in part on results of monitoring said first layer and said second layer;

wherein said processor is further configured to detect a change in status of said first layer;

wherein if said change in status of said first layer is from up to down, said processor is further configured to check the status of the second layer; and wherein if said checked status of said second layer is up, said processor is further configured to check the current status of the first layer.

16. The apparatus of claim 15, wherein said processor is further configured to repeat checking the status of said second layer and the current status of said first layer in order to determine a number of changes in the status of said first layer, and said processor is further configured to enable transmission of data over said communication link based upon said number of changes in the status of said first layer.

17. A method for monitoring the status of a communication link comprising a first layer and a second layer, said method comprising:
monitoring said first layer of said communication link, wherein said first layer is a physical layer, monitoring said second layer of said communication link, wherein said second layer is a higher-level layer than said first layer; and enabling transmission of data over said communication link based at least in part on results of said monitoring of said first layer and said monitoring of said second layer, including enabling transmission of data over said communication link if said second layer is up and said first layer is stable.

18. An apparatus, comprising:
an interface to a communication link, wherein said communication link comprises
a first layer and a second layer, wherein said first layer is a physical layer and
wherein said second layer is a higher-level layer than said first layer; and a processor configured to monitor the status of said first layer and said second layer of said communication link, and wherein said processor is configured to enable transmission of data over said communication link based at least in part on results of monitoring said first layer and said second layer;

wherein said processor is configured to enable transmission of data over said communication link if said processor detects that said second layer is up and said processor determines that said first layer is stable.

* * * * *